Dec. 23, 1952 C. E. LOMAX 2,623,125

AUTOMATIC PARTY LINE METERING

Filed July 29, 1950 2 SHEETS—SHEET 1

FIG. I

INVENTOR.
CLARENCE E. LOMAX

BY

ATTORNEY

Dec. 23, 1952 C. E. LOMAX 2,623,125

AUTOMATIC PARTY LINE METERING

Filed July 29, 1950 2 SHEETS—SHEET 2

INVENTOR.
CLARENCE E. LOMAX

BY *Chas. Le. Conly*

ATTORNEY

UNITED STATES PATENT OFFICE 2,623,125

AUTOMATIC PARTY LINE METERING

Clarence E. Lomax, Chicago, Ill., assignor to Automatic Electric Laboratories, Inc., Chicago, Ill., a corporation of Delaware Application July 29, 1950, Serial No. 176,757

14 Claims. (Cl. 179—8.5)

Figure 1:
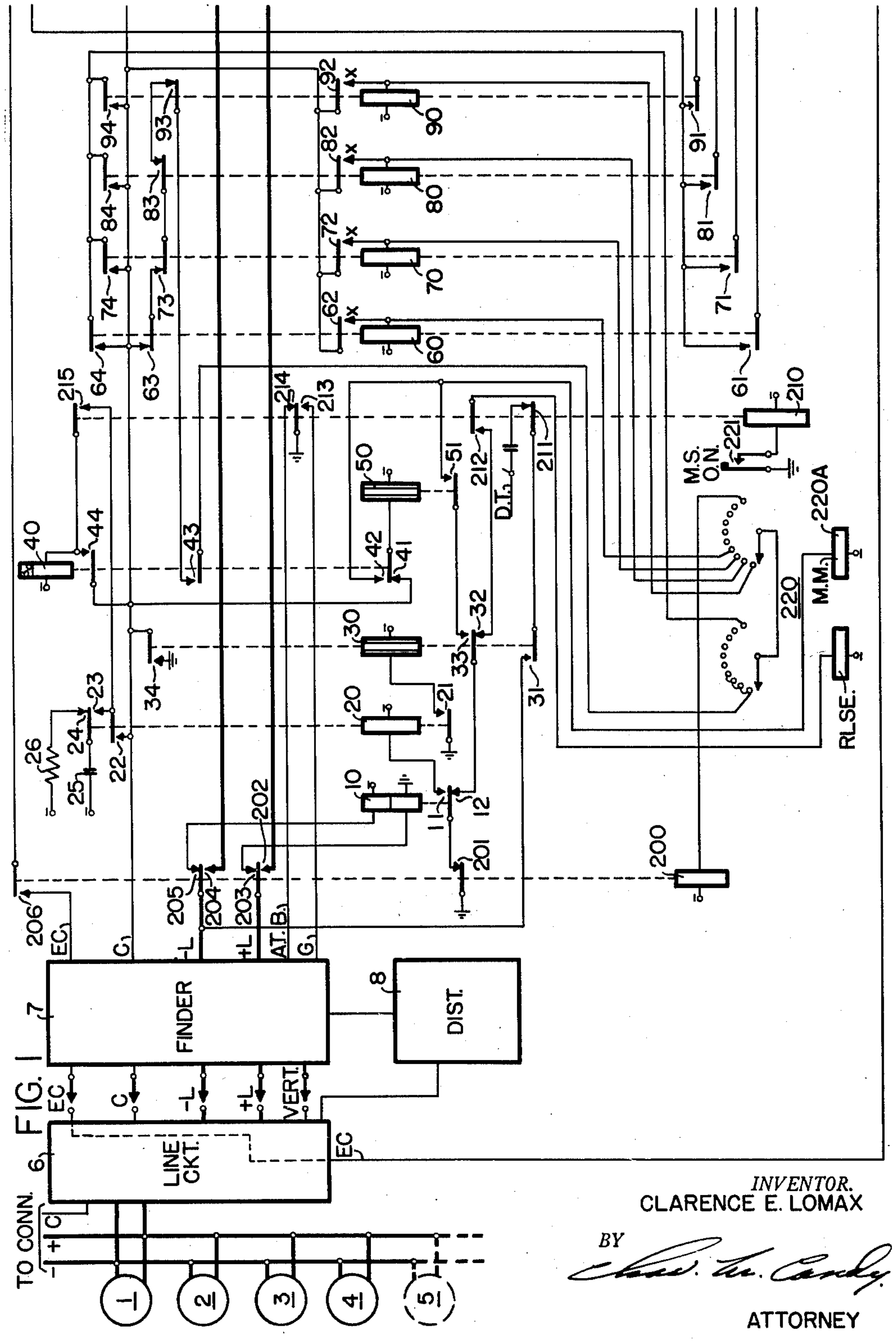

The present invention relates to apparatus for metering a call received from a subscriber on a multi-party line.

It is an object of the invention to provide a party line metering apparatus in which the subscriber cannot easily dial a signal which will result in one of the other parties on the line being charged with the call.

Another object is to provide an automatic switch train which gives metered service to stations on a party line, and which has the meter-selector and all its associated parts in the primary trunk circuit rather than in the line circuit.

A further object is to provide an automatic switch train which gives metered service to stations on a party line and which provides a slight delay in metering when the called party answers.

Another object is to provide a delayed metering arrangement which is controlled over a separate conductor.

Another object is to provide a metering apparatus which employs matched pulsing to operate the selected meter which is located in the trunks instead of the line.

A feature of the invention is the use of shunt-field or polarized meters to avoid the need of individual wires to each meter.

The novel features believed to be characteristic of the invention are set forth with particularity in the appended claims. The invention, both as to its organization and method of operation, together with further features will best be understood by referring to the following specification taken in connection with the accompanying drawings, which when placed side by side with Fig. 1 at the left illustrate diagrammatically the metering apparatus of this invention.

It has previously been mentioned that the metering apparatus of this invention is particularly useful in an exchange arranged for automatic toll ticketing. A system of this character is described in Ostline Patent 2,410,520 which issued November 5, 1946. Another system for accomplishing party line metering was described in Obergfell Patent 2,043,674, which issued June 9, 1936.

The dial in the Obergfell patent is an eleven-point dial in which the pulsing of the digit 11 causes a rotating cam to cancel any one of the eleven pulses. Each subscriber on the line has his dial set in such position that the cancellation pulse is in a different position to that of all other dials on the line. It is the cancellation pulse which determines the meters to be operated. This arrangement makes it possible to give metered service to a ten-party line and it is very difficult for a subscriber to select the wrong meter. However, it is necessary that the subscriber dial the prefix digit 11 in order that a meter be selected.

In the system disclosed in the Ostline patent it is not necessary to dial a prefix digit. The system is not arranged to give meter selection to more than a four-party line. Special pulsing springs on the dial can send one, two or three meter pulses. These meter pulses are sent for each dialed digit and for this reason the standard switch train cannot be pulsed directly from the dial. Instead, a repeater must be used in the primary trunk. This repeater has a pulsing relay which is made especially for this dial and it has a differential relay in series with it. The differential relay is operated by the ground or meter pulses for selecting the meter.

Figure 2:
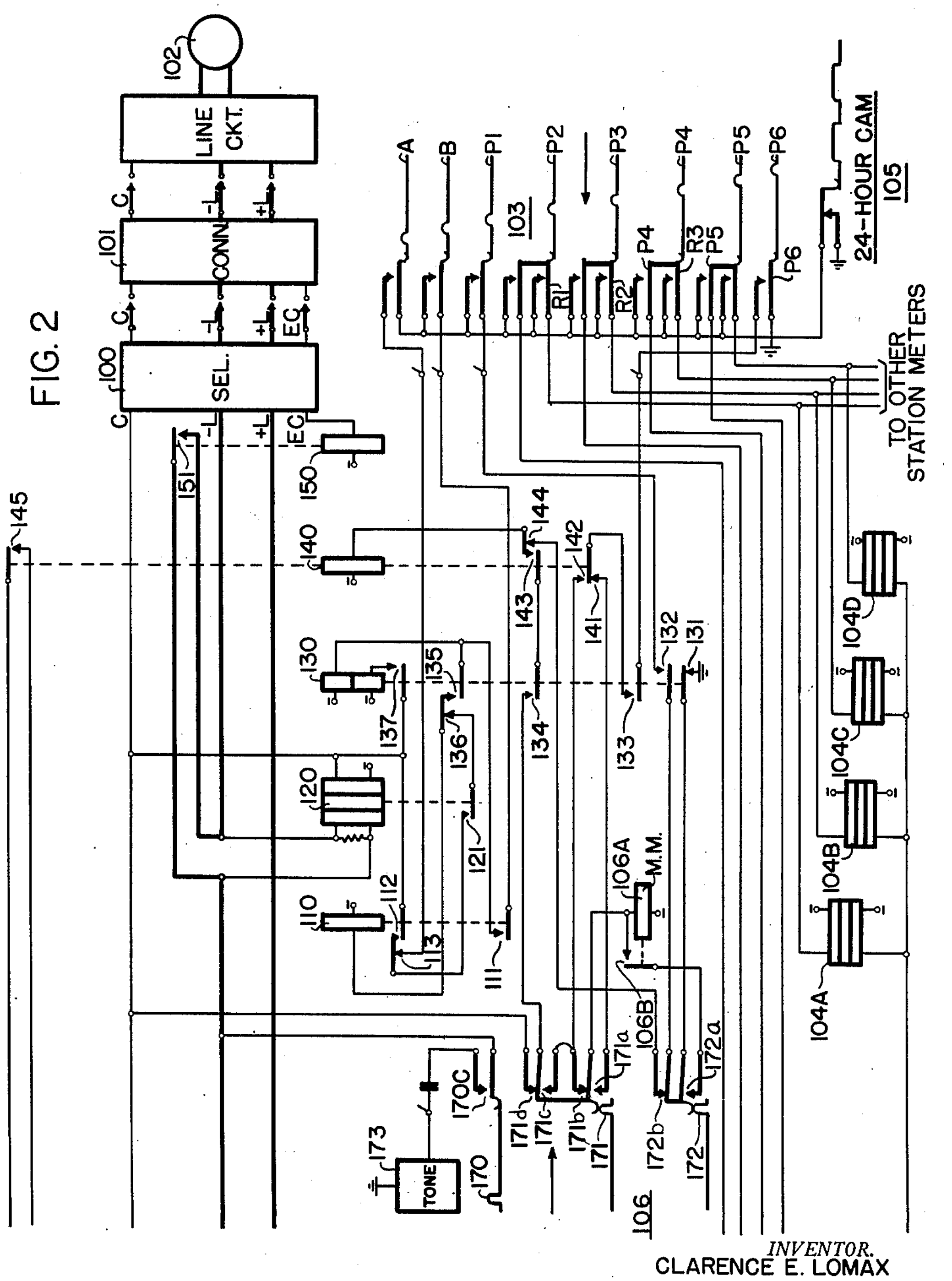

Much of the apparatus shown in Figs. 1 and 2 is standard and is of the type well known in the art and in use for many years. Accordingly, it has been shown in block form.

In Fig. 1 a plurality of party line subscribers are indicated at 1, 2, 3, or 4. The dials at these party line subscribers' stations are of the prefix digit type disclosed in the Obergfell patent previously mentioned. Since the prefix digit sends ten pulses (eleven pulses with one cancelled) as many as ten parties could be accommodated by the illustrated metering system and these additional parties are indicated by station 5 which is shown in dotted lines. For the sake of simplicity the system is described with reference to a four-party line.

The four parties are connected to a standard line circuit 6 and a standard line finder 7 which has a standard distributor 8 connected therewith. The finder 7 may be either a one-hundred-point or two-hundred-point type.

Leads associated with the finder 7 are the line leads, —L and +L, a control lead C, an extra control lead EC, a guard lead G, and an all-trunks-busy lead ATB. The two line leads pass through contacts of a relay to a selector 100 and a connector 101 to a called subscriber 102.

Equipment necessary to the metering system includes a set of constantly rotating cams 103 and a set of meters 104A, 104B, 104C, and 104D. The meters 104A–D may consist of any desired type of matched pulse recording equipment readily available on the market and are shown therefore in schematic form. A twenty-four-hour cam 105 may be used to control the operation of the cams 103. The twenty-four-hour cam 105 may be used to cause lines to be metered during certain portions of the day and not during other portions of the day.

A recording cam 106 is advanced by a motor magnet 106A to control the registering of the meters 104A–D in a manner to be more fully explained hereinafter.

In order to illustrate the operation of the system a call initiated by suscriber 3 will now be traced. Subscriber 3 initiates a call by controlling the line circuit 6 and causing the finder 7 to find the line in the usual manner. While the finder 7 is seeking a line it causes a relay 10 to be energized through the line leads −L and +L, and the contacts 203 and 205 of a relay 200. The operation of the relay 10 completes a circuit from ground through the contacts 201 and 11 for the operation of a relay 20. The relay 20 in turn furnishes ground through its contacts 10 for the operation of a slow-release relay 30. The operation of the relay 30 then furnishes ground at its contacts 34 for the C conductor thereby preventing the release of the finder and line circuit when the distributor 8 is advanced. The relay 10 responds directly to dial pulses and the relay 20 is an auxiliary pulsing relay which follows the pulsing from the relay 10. This auxiliary relay 20 is used in order not to overload the relay 10 which would fail to function under extreme line conditions with a heavy spring load. The operation of the relay 30 completed the following circuit for the energization of a relay 50: ground, contacts 34, conductor C, contacts 41, relay 50 and battery to ground. The operation of relay 50 prepares the following circuit for the operation of a motor magnet 220A of a minor switch 220: ground, contacts 201, 12, 33, 51, motor magnet 220A, and battery to ground. The release of the relay 10 then steps the minor switch 220.

When the relay 20 first operates it charges an associated condenser 25 by a circuit from ground through contacts 34, conductor C, contacts 22 and 23, condenser 25 and battery to ground. When the relay 20 restores in response to the pulse it discharges the condenser through contacts 24 and a resistance 26.

As the relay 10 restores in response to the first pulse it operates the minor switch 220 which closes its off normal springs 221 and this furnishes ground for the operation of relay 210. As the relays 10 and 20 operate relay 20 closes a circuit to its condenser 25 and to a slow-to-operate meter-selecting relay 40, the relay 40 being operated through the following circuit: ground, contacts 34, conductor C, contacts 22 and 215, relay 40 and battery to ground. The relay 40 tries to operate but before it can do so the condenser 25 which has just been discharged must be charged. Since the relay 40 is slow-to-operate it will not operate on a normally timed closure of the dial springs. However, if the first pulse is the cancellation pulse for the particular subscriber calling, the relay 40 will be operated. Since subscriber 3 will normally have the third pulse cancelled and since subscriber 3 is here assumed to be making the call the relay 40 will not be operated on the first pulse. The second pulse is handled like the first pulse and the condenser 25 is again discharged so as to continue the means for delaying the operation of the relay 40. In the meantime the relay 50 is being continually held operated from the relay 30 so that it has time to become well saturated before it is required for service.

Of the eleven pulses which the dial is sending the third pulse is shunted in order to cause the desired matched pulse to be selected. Since it is station number three making the call the prefix digit will shunt pulse 3. The first two pulses for stepping the minor switch 220 and the shunted third pulse will cause the minor switch 220 to step to contact 3 where it will hold for a longer period than usual before pulse 4 can be delivered.

The relays 10 and 20 will remain operated while the dial is absorbing pulse 3. The long operation of the relay 10 gives the relay 40 time to operate. During this time the relay 50 is being held operated by the relay 30. When the relay 40 operates it locks to the conductor C through its contacts 44 and through its contacts 42 transfers the coil of the relay 50 to the pulsing circuit. By the time the relay 40 operates the next pulse is about to be sent and even though there is considerable delay the relay 50 will not restore because it has been saturated by long permanent closure from the relay 30. The relay 50 receives current from the pulse to the magnet and now stays operated for the remainder of the pulsing period.

It falls back at the end of the dialed digit and opens its contact 51 to prevent further pulses from going to the motor magnet 220A.

In the meantime, while the wipers at the minor switch 220 were resting on contact 3 and after the relay 40 had operated, the following circuit was closed through the minor switch 220 to operate a relay 70: ground, contact 34, conductor C, contacts 63, 73, 83, 93, and 43, the bank of the minor switch 220 shown to the left, contact 3 of the bank of the minor switch shown at the right, relay 70 and battery to ground. Relay 70 now locks to conductor C through its "x" contacts 72, at its contacts 73 relay 70 opens the series chain which removes ground from the C conductor to prevent the subsequent operation of a relay 60 as the wipers of the minor switch 220 pass over contact 4.

If the prefix digit is correctly dialed, the wipers of the minor switch 220 will be on contact 10 at the end of the digit. This closes the following circuit for the operation of a relay 200: ground, contacts 34, conductor C, contacts 74, contacts 10 of minor switch 220, relay 200 and battery to ground. The relay 200 closes its contacts 202 and 204 to switch the call through to the selector 100 which is now ready to receive the directory number.

In the meantime, the operation of the relay 70 has selected the number three matched pulse as the pulse to be later sent to the meter. The operation of relay 200 has opened its contacts 203 and 205 to prevent further pulses from being sent to the relay 10 and the contacts 201 have opened to remove ground from relay 50 which restores after its release period. At this point relay 10 cannot step the minor switch 220 because the relay 50 prevents it and the relays 10 and 30 cannot release the minor switch because the open contacts 201 of the relay 200 prevent it. The relay 30 opens its contacts 34 to remove ground from conductor C but this ground has been replaced by ground from the selector 100 before the release of relay 30.

The manner in which the operation of relay 70 selects a particular meter in order to identify subscriber 3 as the calling party will now be outlined. A shunt field relay 120 has the winding shown on the right in Fig. 2 energized through conductor C prior to the time the line conductors, —L and +L, are extended through to the selector 100 by the energization of the relay 200. However, since the relay 120 is a shunt field polarized relay it does not operate when this one winding is energized. As the line conductors are extended through to the selector 100 current flows through the winding of the relays 120 shown on the left in Fig. 2 but in a direction opposite to the flow through the right winding so that the operation of the relay is still prevented.

When the called party 102 answers the call the relay 120 will operate. After the relay 120 has operated it closes its contacts 121 to enable the cam A of the set of rotating cams 103 to complete the following circuit for the energization of a relay 110: ground, twenty-four hour cam 105, the contact of cam A, contacts 113, 121, and 136, relay 110 and battery to ground. A moment later the cam B of the cam set 103 closes its contact to energize a relay 130 through the contacts 111 of the relay 110. After operation, the relay 130 locks to the conductor C through its lower winding shown in Fig. 2 and its contacts 137.

When the relay 130 has operated the pulse sent by the cam P1 operates the relay 140 through the following circuit: ground, twenty-four hour cam, contacts closed by the P1 pulse, contacts 132, 172, and 144, relay 140 and battery to ground. The relay 140 then locks to conductor C through the contacts 143, 134, and 171D.

The pulses from the P1 to P6 cams follow in order and the P2 to P5 pulses are the matched pulses for meter operation. A series of R pulses (R1 to R4) are sent in synchronism with the pulses of the P2 to P5 cams and the R pulses go to the upper windings of the meter coils 104A–D. The R pulses have no effect on the meters unless a pulse from a P2 to P5 cam is also received to energize one of the lower windings of one of the meters 104A–D.

In the present call when the P2 cam closes its contact an R1 pulse energizes the upper winding of the meter 104A by the following circuit: ground, twenty-four hour cam, R1, upper winding of the meter 104A and battery to ground. This is not enough to operate the meter 104A as both windings must be energized in order to bring this about. If the contacts 91 of the relay 90 were closed a circuit would be completed for energization of the lower winding of the meter 104A but since the relay 90 is not energized the contacts 91 are open and the meter 104A is not operated.

Similarly, the P3 cam closes the R2 contacts for the energization of the upper winding of the meter 104B but the lower winding is not energized since the contacts 81 of the relay 80 are open.

The pulse sent by the P4 cam closes the R3 contacts for the energization of the upper winding of the meter 104C. Since the relay 70 is operated the lower winding of the meter 104C is energized by the following circuit: ground, twenty-four hour cam, contact closed by cam P4, contacts 71, 145, 206, conductor EC, linefinder 7, line circuit 6, conductor EC, lower winding of meter 104C, and battery to ground. It will be noted that the lower windings of all of the meters were energized but since the upper winding of meter 104C only was energized it is only this 104C meter which will operate.

The pulse sent by the cam P6 follows the pulse sent by the cam P5 and it energizes the motor magnet 106A of the rotary switch timer 106 through the following circuit: ground, the pulse sent by the cam P6, contacts 133, 142, 171B, motor magnet 106A and battery to ground. The timer 106 is of the type which steps when its magnet is opened and therefore it steps after the completion of the P6 pulse. As it steps it opens its contacts 171D to let the relay 140 restore which transfers the P6 pulse circuit to a back contact 141 of the relay 140.

The sending of the P6 pulse will be followed by again sending the A, B, and P1 to P5 pulses but they will now serve no purpose. The operation of the relay 130 has nullified the effect of the A pulse; the restoration of the relay 110 nullifies the effect of the B pulse; the cam 172 has opened the contacts 172B to stop the P1 pulse; and the relay 140 has restored to stop the effect of the P2 to P5 pulses.

The P6 pulses continue to be sent to the magnet 106A of the conversation timer 106 through the contacts 141 and 171A so as to advance it for timing purposes.

The pulses over P6 keep advancing the cams of the timer 106 during the conversation and if the conversation continues long enough the cam 170 will place a momentary tone from a tone producer 173 to warn the parties that another charge will soon be made for the call. If they do not disconnect, the cams of the timer 106 will soon return to the home position as shown. Since the cam 172 now has its springs operated, a circuit is prepared for the P1 pulse to re-operate the relay 140 and the same process of metering as previously described again takes place. However, on this repeat metering, the A and B pulses have no functions to perform.

When the parties hang up, the switch train releases and ground is removed from the C conductor. This lets the relays 200 and 70 restore and the contacts 201 close a circuit to the release magnet of the minor switch 220 which restores and lets the relay 210 restore. If the minor switch 220 fails to release, the relay 210 keeps the guard lead G grounded through its contacts 213. Its contacts 214 are then open and the ATB conductor is ungrounded so the trunk cannot again be seized and so that the finder 7 and the distributor 8 will operate in the customary manner.

The removal of ground from the C conductor also restores the relay 130. The restoration of the relay 130 closes its contacts 131 which completes an interrupter circuit to the conversation timer 106 which rapidly returns to its home position. The opening of the contacts 133 prevents the P6 pulses from having any further effect. If the trunks should again be seized before the timer 106 has returned to normal, the seizure would not stop the restoring because the relay 130 cannot again operate until a call is extended and answered.

A relay 150 is energized from a succeeding switch or trunk equipment (not shown). Its purpose is to shunt the series winding of the relay 120 so that if the call is a toll call and if the combining line and the recording trunk is of the reverse battery type, a toll call will not be metered.

If the subscriber 4 had initiated the call the relay 40 would have been energized at the fourth pulse of the prefix digit and the relay 60 would then have been energized instead of the relay 70. Both windings of the meter 104D would then have been energized by the P5 pulse of the rotating cam set 103. Otherwise the apparatus would have operated in the manner set forth for the call by subscriber 3.

Similarly, if the subscriber 1 had initiated the call the relay 40 would have been operated at the first prefix pulse, relay 90 would have been energized and the meter 104A would subsequently have been operated. If the subscriber 2 had initiated the call the relay 40 would have been energized at the second prefix pulse, the relay 80 would have been energized, and the meter 104B would subsequently have been operated.

The twenty-four-hour cam 105 was placed in the circuit in order to enable operation of the meters to be discontinued at certain times of the day such as the slack periods.

The cams of the cam set 103 must have a rather accurate speed of rotation. The speed must be such that the time between the A and B pulses will be sufficient to prevent premature operation of the relay 130 should the relay 120 falsely operate while pulsing the digit "0" or during a single period of a reverting call. There need be no appreciable time between the pulses B and P1 other than to insure that the relay 130 is operated in time for the P1 pulse. Likewise, the time between the P1 and P2 pulses must be just sufficient for the relay 140 to operate in time for the P2 pulse. The time between the matched pulses P2 to P5 need be only enough to avoid overlapping and each pulse must be closed long enough to let the selected meter operate. These time elements give almost the complete minimum time in which the cams should make a complete revolution but if they rotate within the minimum time, they will require that the conversation timer 106 take many steps during the matched conversation time period. Fewer steps would be required if the cams of the cam set 103 were made to rotate at a slower speed but this would delay the operation of the meter after the call is answered.

Where it is desirable to increase the metering time during slack periods of the day the rate of rotation of the cam set 103 may be set to slow down during non-busy periods.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In an automatic telephone system, a line, a plurality of subscribers' telephones connected to said line, a pulsing dial in the circuit of each of said telephones, means in each subscriber's dial for dialing a prefix digit, means in each subscriber's dial for shunting a different pulse in said prefix digit whereby the particular pulse shunted identifies the telephone initiating a call, a trunk circuit accessible to said line, means for connecting said line to said trunk circuit, a slow-to-operate relay in said trunk circuit, a relay circuit for energizing said slow-to-operate relay only when a pulse in the prefix digit of a calling subscriber is shunted, a stepping switch, means for stepping said stepping switch on each pulse of said prefix digit, a plurality of registering relays, an energizing circuit individual to each of said registering relays passing through a different contact of said stepping switch and through contacts of said slow-to-operate relay whereby when said slow-to-operate relay is energized only the one of said registering relays whose energizing circuit is completed through said stepping switch is energized, and means for timing a call registered by a registering relay.

2. In an automatic telephone system, a line, a plurality of subscribers' telephones connected to said line, a pulsing dial in the circuit of each of said telephones, means associated with each subscriber's dial for dialing a prefix digit, means associated with each subscriber's dial for shunting a particular pulse in said prefix digit whereby the particular pulse shunted identifies the telephone initiating a call, a trunk circuit accessible to said line, means for connecting said line to said trunk circuit, a group of meter-selecting relays in said trunk circuit, a group of circuits for energizing said meter-selecting relays, one of said last mentioned circuits for each of said meter-selecting relays, means operated responsive to a particular one of said shunted pulses for completing a particular one of said meter-selecting relay circuits to operate a particular one of said meter-selecting relays, and means for metering a call controlled by the operation of said particular one of said meter-selecting relays.

3. In an automatic telephone system, a line, a plurality of subscribers' telephones connected to said line, a pulsing dial in the circuit of each of said telephones, means in each subscriber's dial for dialing a prefix digit, means in each subscriber's dial for shunting a different pulse in said prefix digit whereby the particular pulse shunted identifies the telephone initiating a call, a trunk circuit accessible to said line, means for connecting said line to said trunk circuit, a meter-selecting relay in said trunk circuit, a circuit for energizing said meter-selecting relay only when a pulse in the prefix digit of a calling subscriber is shunted, a stepping switch, means for stepping said stepping switch on each pulse of said prefix digit, a plurality of registering relays, and an energizing circuit individual to each of said registering relays passing through a different contact of said stepping switch and through contacts of said meter-selecting relay whereby the one of said registering relays whose energizing circuit is completed through said stepping switch is energized only when said meter-selecting relay is energized, and a meter individual to each registering relay for recording a call after the associated registering relay has been energized.

4. In an automatic telephone system, a line, a plurality of subscribers' telephones connected to said line, a pulsing dial in the circuit of each of said telephones, means in each subscriber's dial for dialing a prefix digit, means in each subscriber's dial for shunting a different pulse in said prefix digit whereby the particular pulse shunted identifies the telephone initiating a call, a trunk circuit accessible to said line, means for connecting said line to said trunk circuit, a slow-to-operate relay in said trunk circuit, a circuit for energizing said slow-to-operate relay only when a pulse in the prefix digit of a calling subscriber is shunted, a minor switch, means for stepping said minor switch on each pulse of said prefix digit, a plurality of registering relays, an energizing circuit for each of said registering relays passing through a different contact of said minor switch and through contacts of said slow-to-operate relay whereby when said slow-to-operate relay is energized only the one of said registering relays which has its energizing circuit completed through said minor switch is energized, a constantly operating cam set, a plurality of electrical contacts each of which is momentarily closed during the operation of said cam set, a plurality of matched pulse meters and a plurality of circuits connecting said matched pulse meters through contacts of said registering relays and the electrical contacts of said cam set whereby when one of said registering relays is energized the operation of said cam set will send a pair of matched pulses to operate a particular one of said meters.

5. In an automatic telephone system, a line, a plurality of subscribers' telephones connected to said line, a pulsing dial in the circuit of each of said telephones, means in each subscriber's dial for dialing a prefix digit, means in each subscriber's dial for shunting a different pulse in said prefix digit whereby the particular pulse shunted identifies the telephone initiating a call, a trunk circuit accessible to said line, means for connecting said line to said trunk circuit, a slow-to-operate relay in said trunk circuit, a relay circuit for energizing said slow-to-operate relay only when a pulse in the prefix digit of a calling subscriber is shunted, a minor switch, means for stepping said minor switch on each pulse of said prefix digit, a plurality of meters, and a circuit for operating one of said meters through a particular contact of said minor switch when said slow-to-operate relay is energized by the shunting of one of said digit pulses.

6. In an automatic telephone system, a line, a plurality of subscribers' telephones connected to said line, a pulsing dial in the circuit of each of said telephones, means in each subscriber's dial for dialing a prefix digit, means in each subscriber's dial for shunting a different pulse in said prefix digit whereby the particular pulse shunted identifies the telephone initiating a call, a trunk circuit accessible to said line, means for connecting said line to said trunk circuit, a slow-to-operate relay in said trunk circuit, a relay circuit for energizing said slow-to-operate relay only when a pulse in the prefix digit of a calling subscriber is shunted, a stepping switch, means for stepping said stepping switch on each pulse of said prefix digit, a plurality of registering relays, an operable cam set, a plurality of electrical contacts momentarily closed during operation of said cam set, an additional operable cam with an electrical contact which is closed during a portion of the operation of said cam, a circuit through the electrical contact of said additional operable cam for furnishing ground for the operation of the contacts of said cam set, and a plurality of meters one of which is operated responsive to the energization of one of said registering relays and one set of the contacts of said cam set.

7. In an automatic telephone system, a line, a plurality of subscribers' telephones connected to said line, a pulsing dial in the circuit of each of said telephones, means in each subscriber's dial for dialing a prefix digit, means in each subscriber's dial for shunting a different pulse in said prefix digit whereby the particular pulse shunted identifies the telephone initiating a call, a trunk circuit accessible to said line, means for connecting said line to said trunk circuit, a pulsing relay in said trunk circuit energized by pulses of the said prefix digit, a minor switch stepped through contacts of said pulsing relay, a meter-selecting relay energized only by an extra long pulse during the dialing of said prefix digit, a plurality of registering relays each energized by a circuit passing through a different contact of said minor switch, and a plurality of meters one of which is operated by a circuit passing through contacts of one of said registering relays.

8. In an automatic telephone system, a line, a plurality of subscribers' telephones connected to said line, a pulsing dial in the circuit of each of said telephones, means in each subscriber's dial for dialing a prefix digit, means in each subscriber's dial for shunting a different pulse in said prefix digit whereby the particular pulse shunted identifies the telephone initiating a call, a trunk circuit accessible to said line, means for connecting said line to said trunk circuit, a pulsing relay in said trunk circuit energized by pulses of the prefix digit, a minor switch stepped through contacts of said pulsing relay, a slow-to-operate relay energized only by an extra long pulse during the dialing of said prefix digit, a plurality of registering relays each energized by a circuit passing through a different contact of said minor switch, a shunt field relay energized by reverse current received when a called subscriber answers the call, and a plurality of meters one of which is energized in response to the operation of said shunt field relay and a particular one of said registering relays.

9. In an automatic telephone system, a line, a plurality of subscribers' telephones connected to said line, a pulsing dial in the circuit of each of said telephones, means in each subscriber's dial for dialing a prefix digit, means in each subscriber's dial for shunting a different pulse in said prefix digit whereby the particular pulse shunted identifies the telephone initiating a call, a trunk circuit accessible to said line, means for connecting said line to said trunk circuit, a pulsing relay in said trunk circuit energized by pulses of the prefix digit resulting from the dial operation initiated by one of the subscribers, a minor switch stepped through contacts of said pulsing relay, a meter-selecting relay energized only by an extra long pulse during the dialing of said prefix digit, a plurality of registering relays each energized by a circuit passing through a different contact of said minor switch, a shunt field relay energized by reverse current received when a called subscriber answers the call, an operable cam switch, a matched pulse meter for each registering relay, a circuit for operating one of said matched pulse meters, said circuit passing through contacts closed momentarily during operation of said cam switch and also through contacts of which ever one of said registering relays is operated, and a timing cam which is advanced once on each operation of the said cam switch.

10. In an automotive telephone system, a line, a plurality of subscribers' telephones connected to said line, a pulsing dial in the circuit of each of said telephones, means in each subscriber's dial for dialing a prefix digit, means in each subscriber's dial for shunting a different pulse in said prefix digit whereby the particular pulse shunted identifies the telephone initiating a call, a trunk circuit accessible to said line, means for connecting said line to said trunk circuit, a pulsing relay energized by pulses sent out during the dialing of said prefix digit, a minor switch which is stepped during the pulsing of said pulsing relay, a registering relay for each party line subscriber, an energizing circuit for each registering relay passing through a different contact of said minor switch, a slow-to-operate relay, an energizing circuit for said slow-to-operate relay which energizes said relay only when one of the pulses of the said prefix digit is shunted, a circuit passing through contacts of said slow-to-operate relay and one of the contacts of said minor switch for energizing one of said registering relays when the subscriber initiates a call, a shunt field relay energized when a called subscriber answers, a constantly operating cam switch, a circuit responsive to operation of said shunt field relay for enabling said cam switch to become effective, a plurality of contacts momentarily closed in series during the operation of said cam switch, a matched pulse meter for each party line subscriber, a circuit for operating one of said matched pulse meters which is energized responsive to operation of said cam switch and the operation of one of said relays, a timing circuit energized by one of the contacts of said cam switch, and a tone signal for sending a warning tone through the calling circuit after a certain interval of time has elapsed from the initiation of a call.

11. In an automatic telephone system, a line, a plurality of subscribers' telephones connected to said line, a pulsing dial in the circuit of each of said telephones, means associated with each subscriber's dial for dialing a prefix digit, means associated with each subscriber's dial for shunting a different pulse in said prefix digit whereby the particular pulse shunted identifies the telephone initiating a call, a trunk circuit accessible to said line, means for connecting said line to said trunk circuit, a meter-selecting relay in said trunk circuit, a circuit for energizing said meter-selecting relay only when a pulse in the prefix digit of a calling subscriber is shunted, a stepping switch, means for stepping said stepping switch on each pulse of said prefix digit, a plurality of registering relays, an energizing circuit individual to each of said registering relays passing through a different contact of said stepping switch and through contacts of said meter-selecting relay whereby the one of said registering relays whose energizing circuit is completed through said stepping switch is energized only when said meter-selecting relay is energized, a stepping switch relay energized by the first pulse which steps said switch to ground a guard lead and which grounds an all-trunk busy lead on its release, and a meter individual to each registering relay for timing a call after the associated registering relay has been energized.

12. In an automatic telephone system having a group of subscriber stations on one line, each of said subscriber stations having a dial for pulsing over the line which when operated to a prefix digit shunts a particular one of the pulses, a plurality of register relays, a stepping switch associated with the line, said switch operated responsive to the pulses of the prefix digit, an operating circuit for each of said register relays, said operating circuits connected to said stepping switch whereby the operation of said stepping switch consecutively selects said operating circuits, means associated with said line operated responsive to the particular shunted pulse for completing the operating circuit of the register relay to which said switch is stepped, a plurality of meters, a first circuit connected to each of said meters, a second circuit connected to each of said meters, means operated responsive to the operation of one of said register relays for preparing one of the first circuits of one of said meters, and time means sequentially completing said first and second circuits so that said one meter is completely operated only when said first and second circuits of said one meter is completed.

13. In a system as claimed in claim 12, each of said meters comprising two electromagnetic windings wherein the energization of both windings is necessary for complete operation of the meter.

14. In a system as claimed in claim 12, said time means comprising a plurality of constantly moving cams, a plurality of cam switches controlling the completion of said second circuits of said meters, said cams mounted to sequentially operate said cam switches.

CLARENCE E. LOMAX.

REFERENCES CITED

The following references are of record in the file of this patent:

UNITED STATES PATENTS

| Number | Name | Date |
|---|---|---|
| 2,013,171 | Peterson | Sept. 3, 1935 |